United States Patent [19]

DiIoia

[11] Patent Number: 4,773,281
[45] Date of Patent: Sep. 27, 1988

[54] BODY PROTECTING HANDLE GRIPS

[76] Inventor: Michael A. DiIoia, 445 Hillcrest Ave., Somerset, N.J. 08873

[21] Appl. No.: 58,902

[22] Filed: Jun. 5, 1987

[51] Int. Cl.⁴ .................. B62K 21/26; G05G 1/04; G05G 1/10

[52] U.S. Cl. .................. 74/558.5; 74/551.9

[58] Field of Search .............. 74/551.5–551.9, 74/558.5, 523, 543, 557, 558; D8/303; 280/777, 778; 173/170

[56] References Cited

U.S. PATENT DOCUMENTS

| | | |
|---|---|---|
| 245,542 | 8/1881 | Moran .................. 74/551.9 |
| 347,054 | 8/1886 | Morse .................. 74/551.9 |
| 1,421,098 | 6/1922 | Phillips ................ 74/551.9 |
| 2,618,986 | 11/1952 | Hungerford ........... 74/551.9 |
| 2,666,340 | 1/1954 | Hunt .................... 74/551.9 |
| 3,251,241 | 5/1966 | Francis ................. 74/551.9 |
| 3,964,340 | 6/1976 | Antonio et al. ....... 74/551.9 |
| 4,141,567 | 2/1979 | Scott .................... 74/551.9 |
| 4,308,762 | 1/1982 | Jannard ................ 74/551.9 |
| 4,522,083 | 6/1985 | Morgan ................ 74/551.9 |

FOREIGN PATENT DOCUMENTS

| | | | |
|---|---|---|---|
| 156506 | 5/1954 | Australia .................. 74/551.9 |
| 1221709 | 6/1960 | France ..................... 74/551.9 |
| 688541 | 2/1940 | Fed. Rep. of Germany ..... 74/551.9 |
| 374285 | 8/1939 | Italy ........................ 74/551.9 |
| 410497 | 4/1945 | Italy ........................ 74/551.9 |
| 1389679 | 4/1975 | United Kingdom ........ 74/551.8 |

Primary Examiner—Gary L. Smith
Assistant Examiner—Vinh Luong
Attorney, Agent, or Firm—Richard C. Litman

[57] ABSTRACT

A grip assembly particularly adapted for use with the handle bars of powered machines includes a pair of grips each having a hand grip section. One of the grips is provided with a radially extending thumb shielding section forward of the hand grip section and which includes a body-contacting surface projecting inwardly and forwardly of the hand grip section. The other grip is provided with an enlarged body-engaging member disposed rearwardly of its adjacent hand grip section. With this assembly, a user's thumbs are protected from engagement with the body such as when the associated handle bars are urged toward the body by an attached powered machine.

9 Claims, 1 Drawing Sheet

BODY PROTECTING HANDLE GRIPS

BACKGROUND OF INVENTION

1. Field Of Invention

The invention relates generally to handle grips, and more particularly to handle grips as employed on the handle bars of self-powered apparatus such as power trowelers.

The invention further relates to an improved construction which provides means for the protection of body parts from shock and vibration. The invention is particularly suited for use in the construction field and its method of construction is more fully described herein.

2. Description of the Prior Art

Various prior art handle grip devices and the like, as well as their apparatuses and the method of their construction in general, are known and are found to be exemplary of the U.S. prior art. They are:

| U.S. Pat. No. | Inventor |
| --- | --- |
| 245,542 | T. W. Moran |
| 3,344,684 | F. W. Street et al. |
| 4,031,775 | Petty |
| 4,308,762 | Jannard |
| 4,381,579 | Rumpp |
| 4,535,649 | Stahel |

U.S. Pat. No. 245,542 discloses a handle for velocipedes. This devices includes a rubber handle consisting of a ball and neck combined in one piece.

U.S. Pat. Nos. 3,344,684 to Steere et al; 4,031,775 to Petty; 4,308,762 to Jannard; 4,381,579 to Rumpp; and 4,535,649 to Stahel each disclose resilient hand grips. U.S. Pat. No. 4,031,775 provides a hand-gripping section having finger-gripping and palm-gripping means defining a semi-circular area having spaced ribs therealong. Furthermore, this grip provides a torus-shaped thumb guard at one end and a bulbous section at the other end.

These patents disclose various types of hand grips and the like, as well as their method of construction but are not seen to disclose the specific details of the combination of the present invention in such a way as to bear upon the appended claims.

SUMMARY OF THE INVENTION

An object of the invention is to provide improved handle grips, particularly for use on mobile, powered devices such as power trowelers.

Another object of the invention is to provide dissimilar resilient grips for a user's left and right hands.

Still another object of the present invention is the provision of a thumb protector member and a palm protector member.

A further object of the invention is the provision of a thumb protective handle grip having a waist engaging section layered with resilient material serving as a cushion.

These together with other objects and advantages of the invention reside in the details of the process and the operation thereof, as is more fully hereinafter described and claimed. Reference is made to the drawings forming a part hereof, wherein like numerals refer to like parts throughout.

DESCRIPTION OF THE PREFERRED EMBODIMENTS

Figure 3:
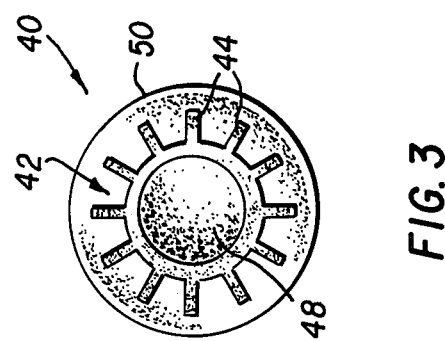
FIG. 3 is an end elevation of the grip shown in FIG. 2.
Figure 1:
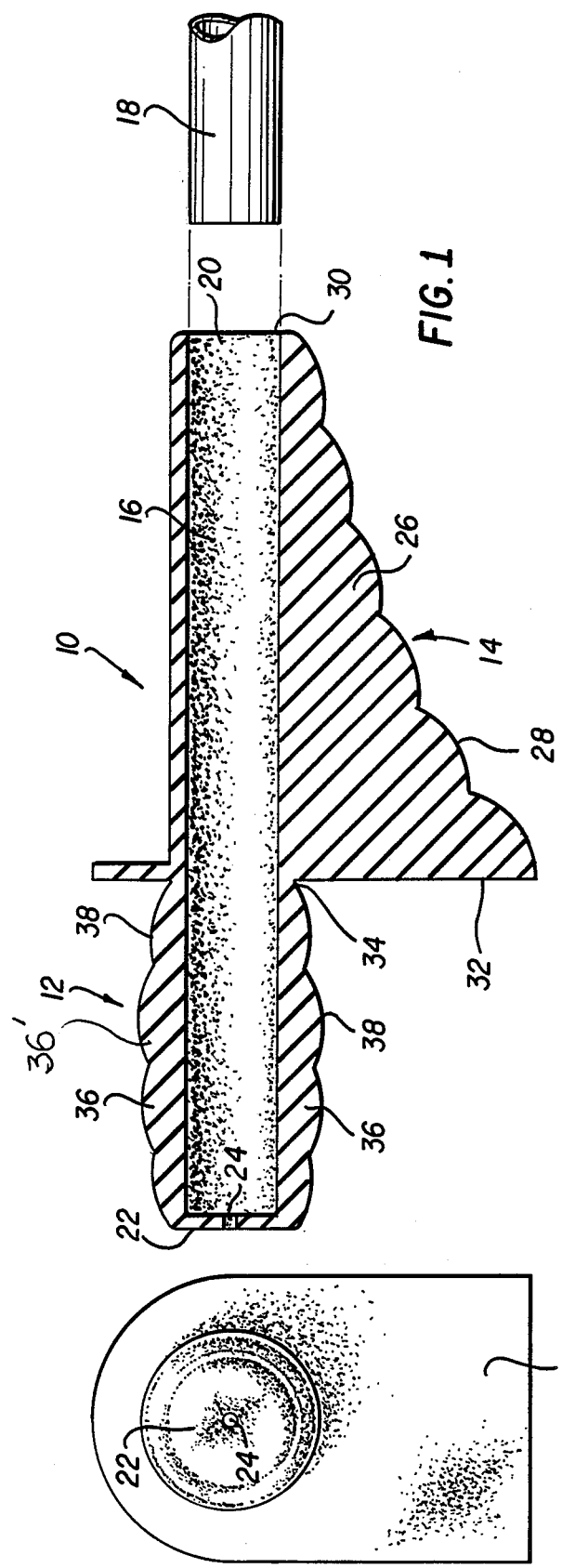
FIG. 1 is a top view of one handle grip according to the invention, illustrating a preferred construction of the thumb protecting member.

Referring now to the drawing, there is illustrated in FIG. 1 a handle grip 10 comprising a hand grip section 12 at one end preferably integral with a thumb protecting section 14 on the other end. The handle grip 10 is provided with an axially extending bore 16 therethrough of an appropriate diameter enabling it to be snugly disposed upon the cylindrical periphery of a left hand handle bar 18 by urging the open end 20 of the grip about the bar. To facilitate this assembly the end wall 22 of the grip is provided with a vent opening 24 as is well known.

The grip 10 of FIG. 1 will be understood to be particularly adapted to serve as a protective apparatus useable on one handle bar end 18 associated with a powered device such as a construction machine. A typical device with which the invention will be most appreciated is a powered troweler, comprising a gas-powered engine presenting a vertical drive shaft serving to rotate a plurality of radially extending blades for top finishing recently poured concrete. The very nature of the operation of such a device will be understood to develope a high degree of vibration and torque. The operator, in controlling the machine, can not be expected to constantly resist the radial thrusts of the machine solely by holding its handle bar at arm's length. Although the present grips may be used on handle bars associated with numerous devices, they are most appreciated when used with an apparatus that requires body assistance to maintain control over the machine's operation. In the case of the power troweler, directional control is achieved and maintained by the user urging with one hand, their hip and or abdomen into firm abutment with one handle bar end while the other hand engages the tool's other handle bar end. The type of the machine of course dictates the particular forces involved. In the case of a power troweler, the left handle bar is normally urged into the user's hip or abdomen with the operator's left thumb being subjected to a constant squeezing and bruising between the handle bar and their body.

The thumb shielding or protecting section 14 extending forward of the hand grip section 12 will be seen to include a laterally and radially projecting cushion or shield member 26 of generally right triangular cross-section. The member 26 is provided with an angular or sloping contact surface 28, preferably scalloped and concave as shown in FIG. 1 and projecting rearwardly and outwardly from the grip forward edge 30 to a radial rear wall 32, at the plane of the front 34 of the hand grip section 12.

It will be understood that the entire handle grip 10 may be constructed of a single grade of resilient material such as rubber or other composition. Alternatively, the exposed surface of the body-engaging portion, such as the contact surface 28, may comprise a resilient layer affixed to an alternate substrate composition.

The hand grip section 12 comprises a cushion element having a plurality of longitudinally extending, radially spaced ribs 36 each provided with a scalloped periphery 38 and preferably wherein the maximum diameter thereof exists in the medial portion 36' thereof.

During use of the grip 10, the operator grasps the hand grip section 12 with the fingers and thumb wrapped transversely about the ribs 36, all fully disposed rearwardly of the thumb protecting section 14. As the associated machine, such as a power troweler, exerts a directional thrust through its handle bar end 18, toward the user, the resilient contact surface 28 is directed against the operator's waist, hip or abdomen. In this manner, the hand maintains this engagement, allowing the body to assist in controlling the machine's travel, while the user's thumb is fully isolated from any squeezing action or abrasion from either the body or handle bar.

Figure 2:
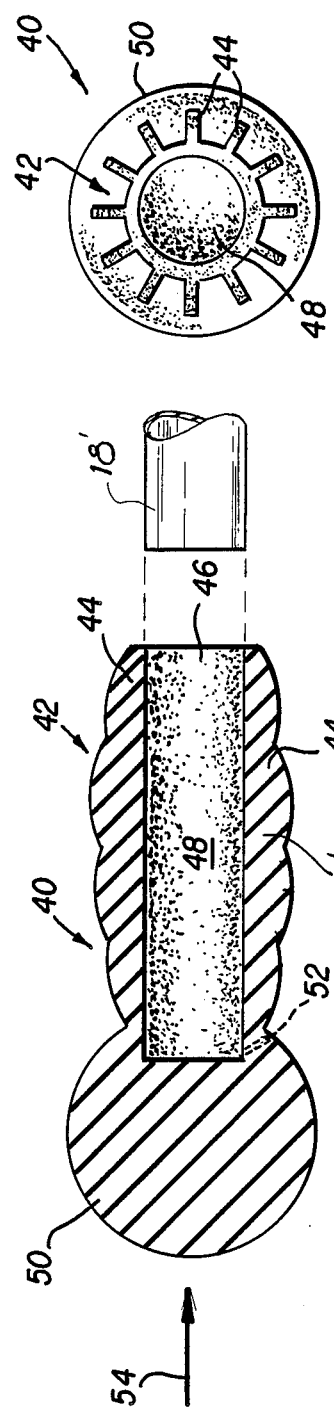
FIG. 2 is a top view of another handle grip forming a part of the invention, illustrating a preferred construction of the palm protecting member.
Figure 4:
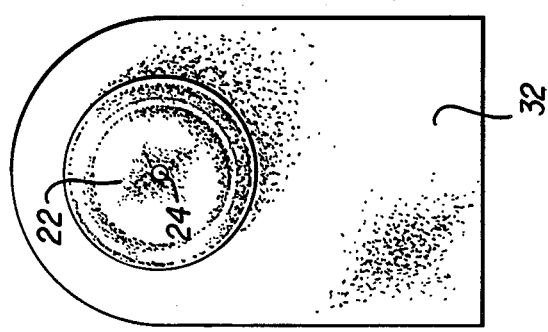

With such an apparatus as above, the user's other or right hand is utilized to control movement of the machine such as during the formation of overlapping passes, while finishing the surface of a poured concrete body. The operator's right hand palm is normally urged, in a cupped manner, against the end of the right handle bar and often results in cramped fingers, wrist tension, tennis elbow or other muscle soreness. To overcome this discomfort, the second handle grip 40 as shown in FIG. 2 is provided and which includes a hand grip section 42 having ribs 44 similar to the ribs 36 of the grip 10, including a maximum diameter in the medial area 44'. The forward edge 46 of the open ended bore 48 is slipped about the other or right hand handle bar end 18' and thereby presents a spherical resilient element 50 at the outer end of its mounted handle bar.

The body protecting section or spherical element 50 is preferably integral with the balance of the handle grip and may include a suitable vent passage 52 to facilitate mounting of the grip upon a handle bar. The diameter of the element 50 will be seen to be greater than that of the ribbed section 42 and allows a user to cup their palm about its periphery to readily and more effortlessly control movement of the associated machine by applying pressure in the direction of the arrow 54 in FIG. 2.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents which may be resorted to, fall within the scope of the invention.

I claim:

1. A handle grip assembly comprising in combination, a handle bar having having two free ends, first and second elongated handle grips each having an open forward end respectively mounted on said handle bar ends, said first handle grip having a rearmost hand grip section adjacent a forwardmost thumb shielding section, said thumb shielding section radially extending from at least one side of said first handle grip a distance substantially greater than the radial extent of said hand grip section, an outer contact surface on said thumb shielding section extending inwardly and forwardly to said first handle grip forward end, resilient means on said outer contact surface adapted to engage the mid-portion of a user's body as their one hand grasps said hand grip section, said second handle grip including a forwardmost hand grip section, a rearmost enlarged body engaging member adjacent said forwardmost hand grip section, said body engaging member having a diameter substantially greater than said adjacent second hand grip section and comprising a resilient composition adapted to be engaged by the palm of a user's other hand.

2. A handle grip assembly according to claim 1 wherein, said first and second handle grips are each of one-piece construction.

3. A handle grip assembly according to claim 1 including, longitudinally extending arcuately spaced ribs radially extending from said hand grip sections.

4. A handle grip assembly according to claim 1 wherein, said first and second handle grips are adapted to be mounted upon the left and right hand portions, respectively, of the handle bar.

5. A handle grip assembly according to claim 1 wherein, said outer contact surface is substantially concave.

6. A handle grip assembly according to claim 1 wherein, said outer contact surface is scalloped.

7. A handle grip assembly according to claim 1 wherein, said rearmost body engaging member comprises a spherical element.

8. A handle grip assembly according to claim 1 wherein, said ribs of said first and second grips include a scalloped outer periphery.

9. A handle grip assembly according to claim 8 wherein, said ribs include medial portions defining the maximum diameter of said ribs.

* * * * *